Feb. 4, 1936.  H. RETTSTADT  2,029,794
TOOL HANDLE FASTENING
Filed Nov. 27, 1934
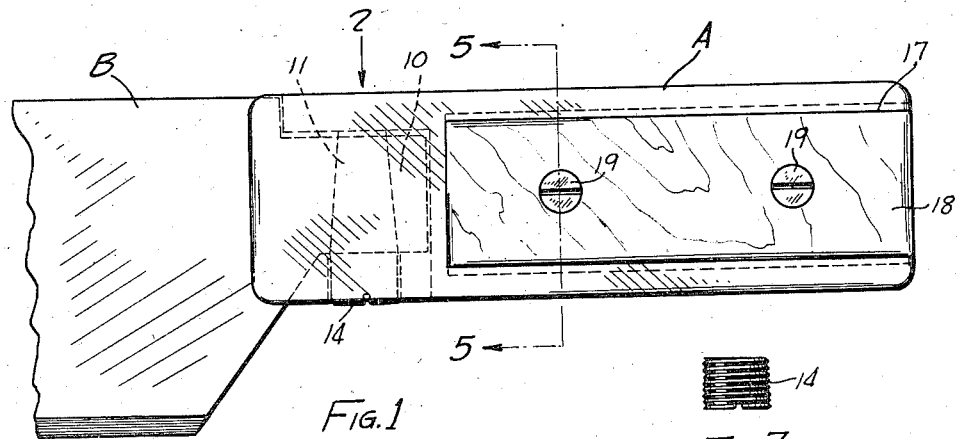
Fig. 1
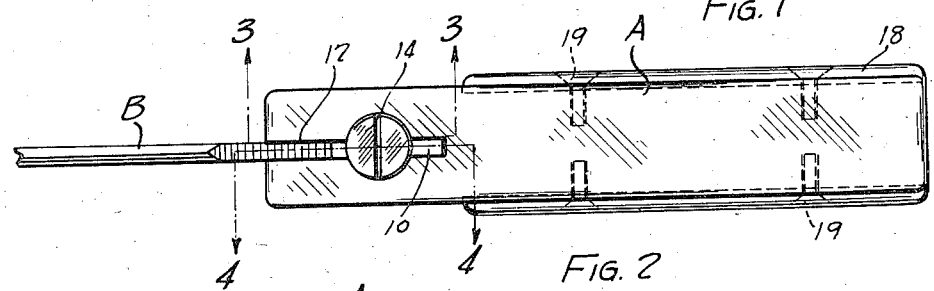
Fig. 7
Fig. 2
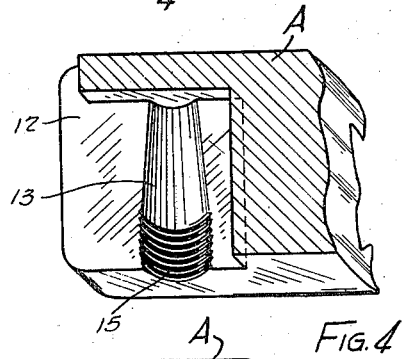
Fig. 4
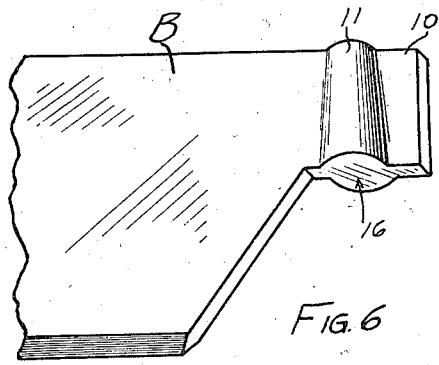
Fig. 6
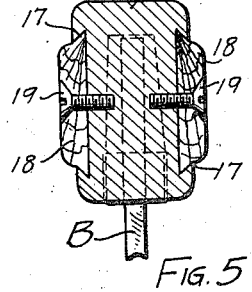
Fig. 5
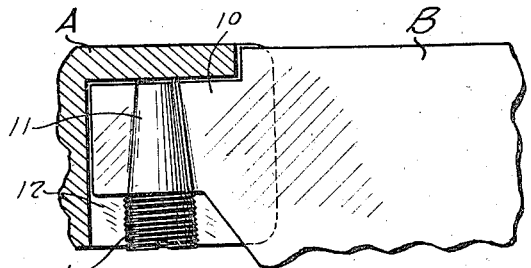
Fig. 3
INVENTOR:
Hugo Rettstadt
BY Joshua R. H. Hotts
ATTORNEY Patented Feb. 4, 1936

2,029,794

UNITED STATES PATENT OFFICE 2,029,794

TOOL HANDLE FASTENING

Hugo Rettstadt, Aldan, Pa.

Application November 27, 1934, Serial No. 754,947

3 Claims. (Cl. 306—26)

This invention relates to tool handle fastenings, and has for an object to provide improved means for connecting an implement and a handle.

A further object of the invention is to provide improved means for connecting an implement to a handle, including means for readily separating the handle and tool and returning the parts to combination.

A further object of the invention is to provide an improved fastening for an implement in a handle, whereby the implement can be removed from the handle with the minimum accompanying connecting parts, the principal connecting parts remaining in the handle.

A further object of the invention is to provide an implement and handle, one of which is provided with a tapered socket, and the other with a tapered part complementary to the tapered socket, with means for pressing the tapered part into the tapered socket for rigidity of connection.

The invention, therefore, comprises the combination of a handle and an implement, the handle being provided with a slot to receive a part of said implement and one of the members, preferably the handle, being provided with a tapered and preferably, a conical socket, and the implement in such case provided with a tapered preferably conical complementary part adapted to fit into the tapered socket, with compression means, preferably a screw, for forcing the tapered part into the socket for rigidity of connection between the handle and the implement.

The drawing illustrates an embodiment of the invention and the views therein are as follows:

Figure 1 is a view of an embodiment of the invention shown for illustration and seen in side elevation, showing the handle and a fragment of the implement, Figure 2 is a view as indicated by arrow 2 at Figure 1, which would be a plan view corresponding to Figure 1, Figure 3, taken on line 3—3 of Figure 2, is a fragmentary detailed view showing a fragment of the implement and handle, with the tapered part and screw, Figure 4, taken on line 4—4 of Figure 2, is a detailed fragmentary view of the handle and socket, Figure 5 is a transverse sectional view taken on line 5—5 of Figure 1, Figure 6 is a perspective view of an implement and the connecting part, and Figure 7 is a view in elevation of the compression screw.

Like characters of reference indicate corresponding parts throughout the several views.

As shown in the drawings, the illustrative handle A is adapted for coaction with the implement B. Merely for the purpose of illustration, the implement B is shown of a form to indicate a butcher's cleaver. In such combination the invention will find a great field of utility, but is not limited thereto or thereby.

Such implements require frequent grinding and sharpening and a custom has grown up to employ grinders outside the market who would take away the implements and return them ground. Under such conditions, the present invention offers considerable advantage in that the implement only need be removed, and not the handle, and that when a new implement is required, it may be used in the same handle, thus saving considerable trouble and expense. By such arrangement a handle of considerable merit and, therefore, considerable cost may be employed and the handle continued to be employed for a great length of time, and with a large number of implements.

The implement, whether it be a cleaver or otherwise, is provided with a short section or tang 10 and a conical part 11. The conical part may be constructed as two approximately half cones, soldered, welded or otherwise secured to the tang 10, but will preferably be produced integral with the tang, and during the operation of forming the implement.

The handle A is provided with a slot 12 of the proper width to receive the thickness of the tang 10 and with a conical socket 13 properly proportioned to receive the conical member 11. While this part 11 and the socket 13 have been shown as conical, which will be the approved form, it will be understood that it may be formed otherwise tapered with efficient results.

After the conical part 11 has been introduced into the socket 13, a screw 14 is inserted to engage the screw threads 15 of the socket and bear against the base end 16 of the conical member 11. By reason of the taper of this conical part, the compression of the screw 14 thereon tends to tighten the parts into absolute rigidity whereby the implement is in proper condition for use.

The handle A may be constructed as an integral member. As, however, it is thought desirable that this handle should be constructed of metal, it is also thought desirable to provide the handle with grips of other material, as for instance, wood, fibre or the like. When the handle is so constructed, dovetail overhangs 17 are provided and strips of material 18 having tapered edges are slidably inserted under the overhang 17 forming a dovetail connection, and all secured together by some fastening means, as the screws 19.

When an implement is to be removed from the handle, the screw 14 is first removed by a screw driver or equivalent implement, whereupon the implement B will slide readily out of the handle A because of the tapered connection, and a new implement may be inserted in reverse order, the conical part 11 being slidably inserted into the conical socket 13 and the screw returned to clamping position. This latter action may take place whenever an implement has been removed for sharpening or other processing, or when a new implement is applied to an old handle.

Of course, the tool handle fastening illustrated may be modified and changed in various ways without departing from the invention herein set forth and hereinafter claimed.

I claim:—

1. A tool handle fastening having a slot and offsets from the slot forming a tapered socket in combination with a tool having a tang fitting the slot with tapered offsets fitting the tapered socket, and means to exert pressure in the direction of the taper tending to force the tapered section into the tapered socket.

2. A tool handle fastening comprising a handle having a slot extending longitudinally thereof, with a tapered socket formed in the handle transecting the slot, a tool having a tang properly proportioned to fit the slot with protuberances upon its opposite sides formed as tapers complementary to the tapered slot, and means to exert tension across the slot tending to force the tapered protuberances into the tapered socket.

3. A tool handle fastening comprising a handle having a slot extending longitudinally thereof, with a tapered socket formed in the handle transecting the slot, a tool having a tang properly proportioned to fit the slot with protuberances upon its opposite sides formed as tapers complementary to the tapered slot, and a screw bearing against the larger end of the protuberances tending to force the protuberances into the socket.

HUGO RETTSTADT.